(12) United States Patent  
Xu

(10) Patent No.: US 10,599,013 B2  
(45) Date of Patent: Mar. 24, 2020

(54) SYSTEMS AND METHODS FOR TRANSMITTING UNDERWATER SIGNALS

(71) Applicant: Chengdu CK Technology CO., LTD., Chengdu (CN)

(72) Inventor: Wen-cai Xu, Chengdu (CN)

(73) Assignee: CHENGDU SIOEYE TECHNOLOGY CO., LTD., Chengdu (CN)

(*) Notice: Subject to any disclaimer, the term of this patent is extended or adjusted under 35 U.S.C. 154(b) by 221 days.

(21) Appl. No.: 15/156,981

(22) Filed: May 17, 2016

(65) Prior Publication Data

US 2016/0370687 A1  Dec. 22, 2016

(30) Foreign Application Priority Data

Jun. 16, 2015 (CN) .......................... 2015 1 0332182

(51) Int. Cl.
```
G03B 17/08    (2006.01)
H04N 5/225    (2006.01)
H04N 7/18     (2006.01)
H04N 1/00     (2006.01)
```
(52) U.S. Cl.
CPC ......... *G03B 17/08* (2013.01); *H04N 1/00103* (2013.01); *H04N 5/2252* (2013.01); *H04N 7/185* (2013.01)

(58) Field of Classification Search
None
See application file for complete search history.

(56) References Cited

U.S. PATENT DOCUMENTS

| 5,108,326 A * | 4/1992 | Seiler ...................... B63B 22/18 114/122 |
| 5,163,858 A * | 11/1992 | Sumrall .................... B63C 7/26 441/11 |
| 6,261,142 B1 * | 7/2001 | Fiotakis ................. A01K 69/06 441/11 |
| 6,525,762 B1 * | 2/2003 | Mileski .................. H04N 7/005 348/143 |
| 2005/0259023 A1 * | 11/2005 | Wang ....................... H01Q 7/00 343/764 |
| 2007/0242134 A1 * | 10/2007 | Zernov ................ H04N 5/2252 348/81 |
| 2009/0127856 A1 * | 5/2009 | Hench ..................... F03B 13/20 290/42 |

(Continued)

*Primary Examiner* — William C Vaughn, Jr.
*Assistant Examiner* — Stuart D Bennett
(74) *Attorney, Agent, or Firm* — Perkins Coie LLP

(57) ABSTRACT

The disclosed technology is directed to a floating system capable of facilitating transmitting underwater signals (e.g., images captured underwater) to an abovewater device. The system includes a first housing, a second housing, an antenna, a signal emitter, a signal converter, and a signal interface. The first and second housings collectively form an enclosed space. The antenna is vertically positioned on the top surface of the first main body. The signal emitter and the signal converter are positioned in the enclosed space and coupled to the antenna. The signal interface is positioned on the bottom surface of the second housing and coupled to the converter. A user can connect an underwater camera to the signal interface and transmit images captured underwater to another abovewater device through the floating system.

20 Claims, 7 Drawing Sheets

(56) References Cited

U.S. PATENT DOCUMENTS

| | | | |
|---|---|---|---|
| 2012/0090667 A1* | 4/2012 | Cap | B63B 35/38 |
| | | | 136/251 |
| 2012/0325766 A1* | 12/2012 | Boisvert | A01G 25/14 |
| | | | 215/10 |
| 2013/0187787 A1* | 7/2013 | Damus | H04B 13/02 |
| | | | 340/850 |
| 2014/0084727 A1* | 3/2014 | Martinez | F03B 13/20 |
| | | | 310/154.02 |

* cited by examiner

SYSTEMS AND METHODS FOR TRANSMITTING UNDERWATER SIGNALS

CROSS-REFERENCE TO RELATED APPLICATIONS

This application claims the benefit of Chinese Patent Application No. 2015103321827, filed Jun. 16, 2015 and entitled "AN ASSEMBLY FOR TRANSMITTING UNDERWATER SIGNALS," the contents of which are hereby incorporated by reference in its entirety.

BACKGROUND

Sports cameras can sometimes be operated in water. For example, a scuba diver can use a sports camera to film underwater scenes. Due to ambient constraints, it is difficult for the scuba diver to transfer in real time collected images to others abovewater. Traditionally, a user needs to store underwater images in the camera first, and then transmit the stored images after the user moves out of water. It is inconvenient to the user because the camera may have limited storage space. Therefore, it is advantageous to have an improved method or system that can facilitate instant transmission of underwater images.

BRIEF DESCRIPTION OF THE DRAWINGS

Embodiments of the disclosed technology will be described and explained through the use of the accompanying drawings.

Figure 1:
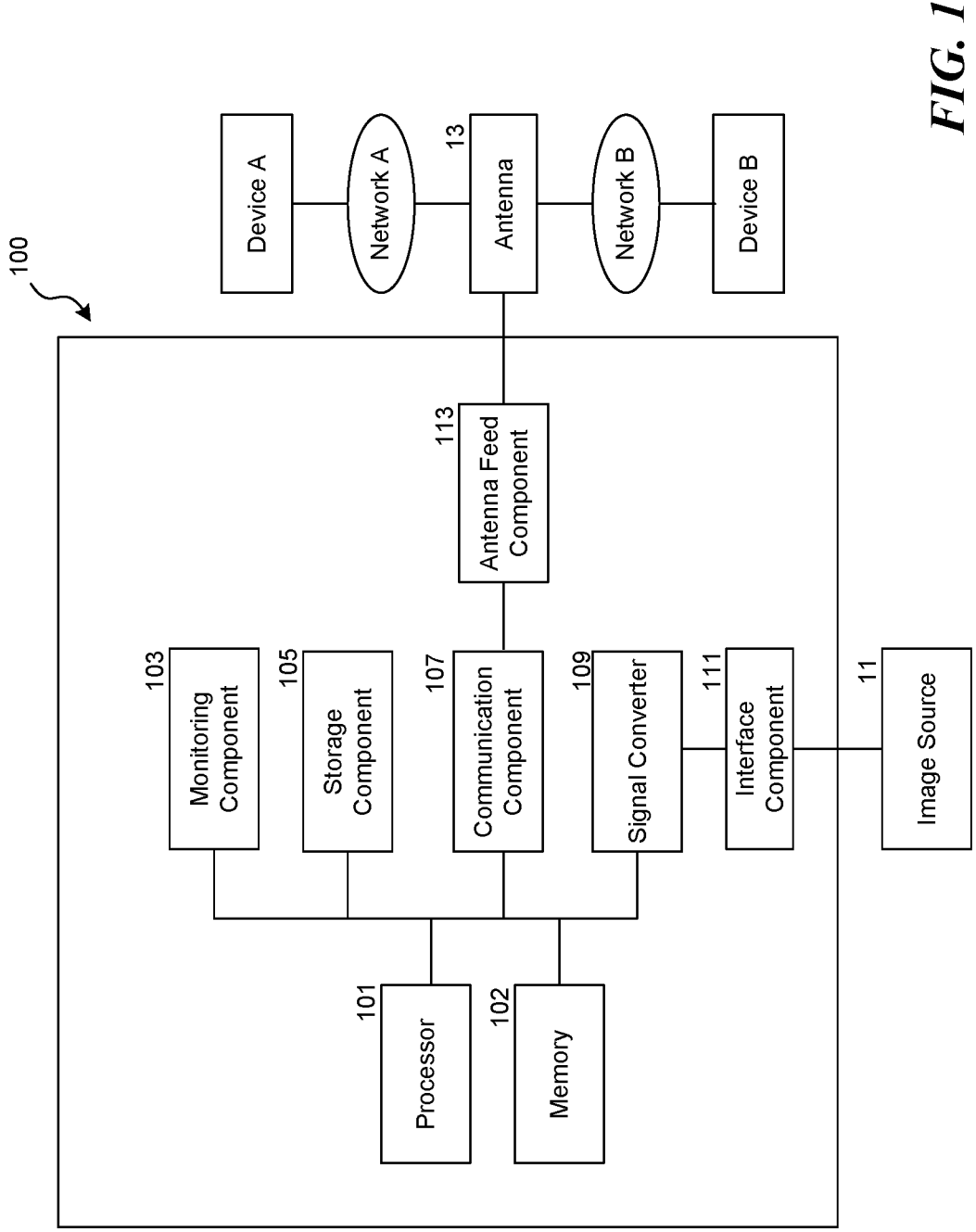
FIG. 1 is a schematic diagram illustrating a system in accordance with embodiments of the disclosed technology. The system is configured to receive image signals from an image source and then transmit it to other devices.

The drawings are not necessarily drawn to scale. For example, the dimensions of some of the elements in the figures may be expanded or reduced to help improve the understanding of various embodiments. Similarly, some components and/or operations may be separated into different blocks or combined into a single block for the purposes of discussion of some of the embodiments. Moreover, although specific embodiments have been shown by way of example in the drawings and described in detail below, one skilled in the art will recognize that modifications, equivalents, and alternatives will fall within the scope of the appended claims.

DETAILED DESCRIPTION

In this description, references to "some embodiment", "one embodiment," or the like, mean that the particular feature, function, structure or characteristic being described is included in at least one embodiment of the disclosed technology. Occurrences of such phrases in this specification do not necessarily all refer to the same embodiment. On the other hand, the embodiments referred to are not necessarily mutually exclusive.

The present disclosure relates to an underwater signal transmission system that is compact, durable, easy-to-assemble, and convenient-to-use. The system enables a user to receive images from an underwater image source (e.g., a diving camera) and transmit the received image to an abovewater device (e.g., a mobile device held by a person on a boat nearby). In some embodiments, the system can first transmit the received images to an abovewater intermediate device (e.g., an unmanned aerial vehicle, UAV, located right above the system), and then the intermediate device can further transmit the images to other devices (e.g., a mobile device on the shore of a water body).

The present disclosure also provides a floating data transmission system that can facilitate data transmission from an underwater device (e.g., an underwater sensor configured to collect information associated with an underwater parameter such as water temperature, water pressure, fluid constituents, etc.). The system can remain floating and be moved in response to a movement of an underwater device attached thereto via a wire component. For example, the floating system can be coupled to an underwater sensor by a waterproof cable. When the underwater sensor is moved (e.g., by a propeller or by a scuba diver), the floating system can be moved accordingly (e.g., dragged by the cable) and remain positioned abovewater.

Another aspect of the present disclosure is that it provides a floating system having a housing structure that is easy to assemble, install and maintain. The system includes two housing parts, and the two housing parts are sealedly connected (e.g., along an installation plane, discussed in detail in FIG. 4A below), so as to form a water-proof chamber. The system can have multiple vulnerable-to-fluid components (e.g., a signal converter, data storage, transmitter, etc.) positioned in the chamber. During maintenance, a user can simply disengage the two housing parts and then have access to a component positioned in the chamber.

The present disclose also provides a floating housing structure that can be operably coupled to an antenna and an interface component. The antenna and the interface component can be positioned to pass through the housing structure such that they can communicate with other devices. The antenna can be positioned on an upper surface of the housing structure for better communication and/or signal reception. The interface component can be positioned on a lower surface of the housing structure for the ease of connecting the interface component with an underwater device.

FIG. 1 is a schematic diagram illustrating a system 100 in accordance with embodiments of the disclosed technology. As shown, the system 100 includes a processor 101, a memory 102, a monitoring component 103, a storage component 105, a communication component 107, a signal converter 109, an interface component 111, and an antenna feed point 113. In the illustrated embodiment, the system 100 is coupled to an (external) antenna 13. In other embodiments, however, the system 100 can include an internal antenna (not shown in FIG. 1). The system 100 is configured to receive image signals from an image source 11 and then transmit it to device A via network A and/or device B via network B. The image source 11 is configured to capture or collect underwater images (pictures, videos, etc.) from the ambient environments surrounding the image source 11. In some embodiments, the image component 11 can be an underwater camera. In some embodiments, the image component 11 can be an underwater video recorder.

In some embodiments, device A can be a mobile device held by one user, and device B can be another mobile device held by another user. In some embodiments, device A can be a smartphone held by a user, and device B can be a tablet carried by the user. In some embodiments, network A and network B can be two different networks with different communication protocols (3G, 4G, Wi-Fi, etc.). In some embodiments, network A and network B can be two different networks with the same communication protocol. In other embodiments, network A and network B can be operated by a common carrier or service provider.

The processor 101 is configured to control the memory 102 and other components (e.g., components 103-113) in the system 100. The memory 102 is coupled to the processor 101 and configured to store instructions for controlling other components in the system 100. The monitoring component 103 is configured to monitor a status of the system 100. For example, the monitoring component 103 can be configured to check whether the system 100 is in an air-tight condition. In some embodiments, the monitoring component 103 can be configured to check whether the system 100 is in a water-proof condition. In some embodiments, the monitoring component 103 can check whether other components (such as components 105-113) function properly. The storage component 105 is configured to store, temporarily or permanently, information/data/files/signals associated with the system 100. In some embodiments, the storage component 105 can be a hard disk drive. In some embodiments, the storage component 105 can be a memory stick or a memory card.

The communication component 107 is configured to communicate with devices/components outside the system 100. The communication component 107 is coupled to the antenna feed component 113, which further connects with the antenna 13. The antenna feed component 113 acts as a signal interface between the antenna 13 and the system 100. For example, the antenna feed component 113 can receive radio waves from the antenna 13 and converts then into a form (e.g., electrical current) that is recognizable by the system 100. Similarly, the antenna feed component 113 can convert signals/information to be transmitted via the antenna 13 to radio waves such that the antenna 13 can transmit the signals/information outwardly.

As shown in FIG. 1, the interface component 111 is coupled to the image source 11. In some embodiments, the interface component 111 can be a water-proof universal serial bus (USB) connector. For example, the interface component 111 can be a USB connector surrounded by a sealing component (e.g., silicon sealant, plastic gasket, etc.). The interface component 111 is coupled to the signal converter 109. The signal converter 109 is configured to verify or convert the format of the images received from the image source 11 via the interface component 111. In some embodiments, the signal convert 109 converts the format of the images such that the converted images are suitable for being transmitted to device A or device B via the antenna 13. In some embodiments, the signal converter 109 and the antenna feed component 113 can be integrated into one component (e.g., in one integrated chip).

Figure 2:
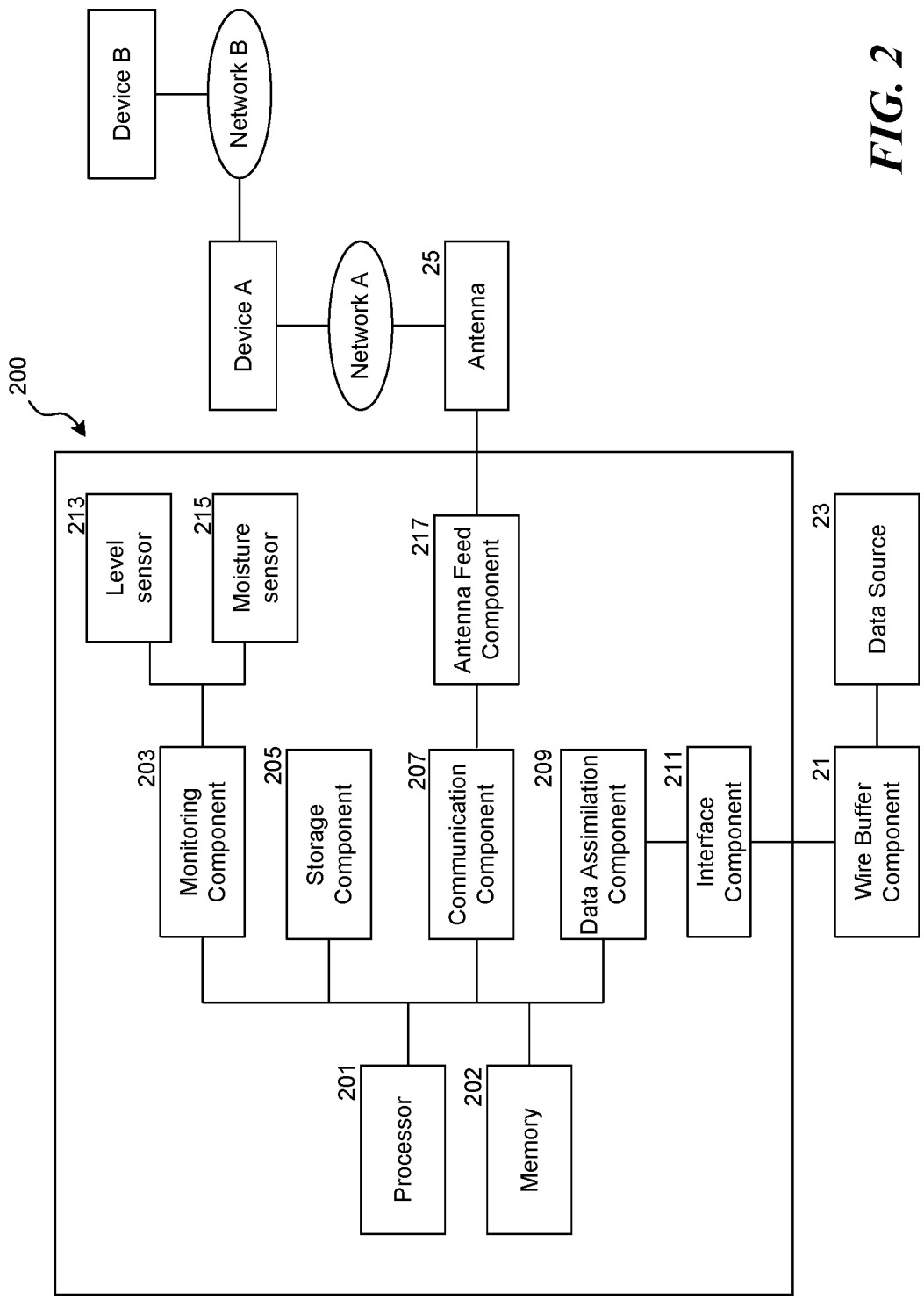
FIG. 2 is a schematic diagram illustrating a system in accordance with embodiments of the disclosed technology. The system is configured to receive image signals from a data source and transmit it to other devices.

FIG. 2 is a schematic diagram illustrating a system 200 in accordance with embodiments of the disclosed technology. The system 200 is configured to receive image signals from an underwater data source 23 and then transmit it to one or more abovewater devices, such as device A and device B. The system 200 includes a processor 201, a memory 202, a monitoring component 203, a storage component 205, a communication component 207, a data assimilation component 209, an interface component 211, and an antenna feed point 217. The system 200 further includes a level sensor 213 and a moisture sensor 215 both coupled to the monitoring component 203. In the illustrated embodiment, the system 200 is coupled to an (external) antenna 25. In other embodiments, however, the system 200 can also include an internal antenna (not shown in FIG. 2).

The system 200 is configured to receive data from the data source 23 (via a wire connection) and then transmit it to device A (e.g., an UAV) via network A. The received data can be further transmitted to device B (e.g., a mobile device held by a person on a boat) via network B. The data source 23 is configured to collect underwater data (e.g., images, sounds, water pressure, water temperature, fluid constituents, etc.) from the ambient environments surrounding the data source 23. In some embodiments, the data source 23 can include one or more suitable sensors to collect corresponding data. In some embodiments, the data source 23 can be coupled to the interface component 211 by a water-proof wire or cable.

As shown in the illustrated embodiments, a wire buffer component 21 can be positioned between the interface component 211 and the data source 23. The wire buffer component 21 is configured to act as a wire buffer when the data source 23 is moved by a user. More particularly, when a user moves the data source 23, the wire connected therewith is moved accordingly. As a result, the system 200 can also be moved in response to the movement of the wire. To optimize the quality of data transmission, the movement of the system 200 needs to be minimized. The wire buffer component 21 can reduce or even eliminate the possible impacts to the system 200 caused by the movement of the data source 23. In some embodiments, for example, the wire buffer component 21 can be a wire roller. In such embodiments, when a user pulls the data source 23 away from the system 200, which accordingly requires a longer wire, the wire buffer component 21 can provide additional wire (e.g., release more wire from the wire roller) without moving the system 200.

The interface component 211 is coupled to the data source 23 via the wire buffer component 21. In some embodiments, the interface component 211 can be a water-proof universal serial bus (USB) connector. For example, the interface component 211 can be a USB connector surrounded by a sealing component. The interface component 211 is coupled to the data assimilation component 209. The data assimilation component 109 is configured to verify or adjust the data received from the data source 23. In some embodiments, the data assimilation component 209 can edit or convert the format of the received data such that the received images can be transmitted to device A or device B and instantly viewed by a user.

The processor 201 is configured to control the memory 202 and other components (e.g., components 203-217) in the system 200. The memory 202 is coupled to the processor 201 and configured to store instructions for controlling other components in the system 200. The monitoring component 203 is configured to monitor a status of the system 200. For example, the monitoring component 203 can employ the level sensor 213 to measure whether the system 200 is horizontal or is tilted. If the level sensor 213 detects that the system 200 is tilted (e.g., caused by water leakage), the level sensor 213 can generate a warning signal and then transmit it to a user of the system 200. The user can then choose to check the status of the system 200 or ignore the warning signal (e.g., the system 200 is transmitting important data). In some embodiments, the level sensor 213 can be a bubble level sensor. In some embodiments, the level sensor 213 can be a digital level sensor. As another example, the monitoring component 203 can employ the moisture sensor 215 to detect moisture within the system 200 so as to determine whether there is any water leakage that may cause malfunctions of the system 200.

The storage component 205 is configured to store, temporarily or permanently, information/data/files/signals associated with the system 200. In some embodiments, the storage component 205 can be a hard disk drive. In some embodiments, the storage component 205 can be a memory stick or a memory card. The communication component 207 is configured to communicate with devices/components outside the system 200. The communication component 207 is coupled to the antenna feed component 217, which further connects with the antenna 25. The antenna feed component 217 acts as a signal interface between the antenna 25 and the system 200.

Figure 3A:
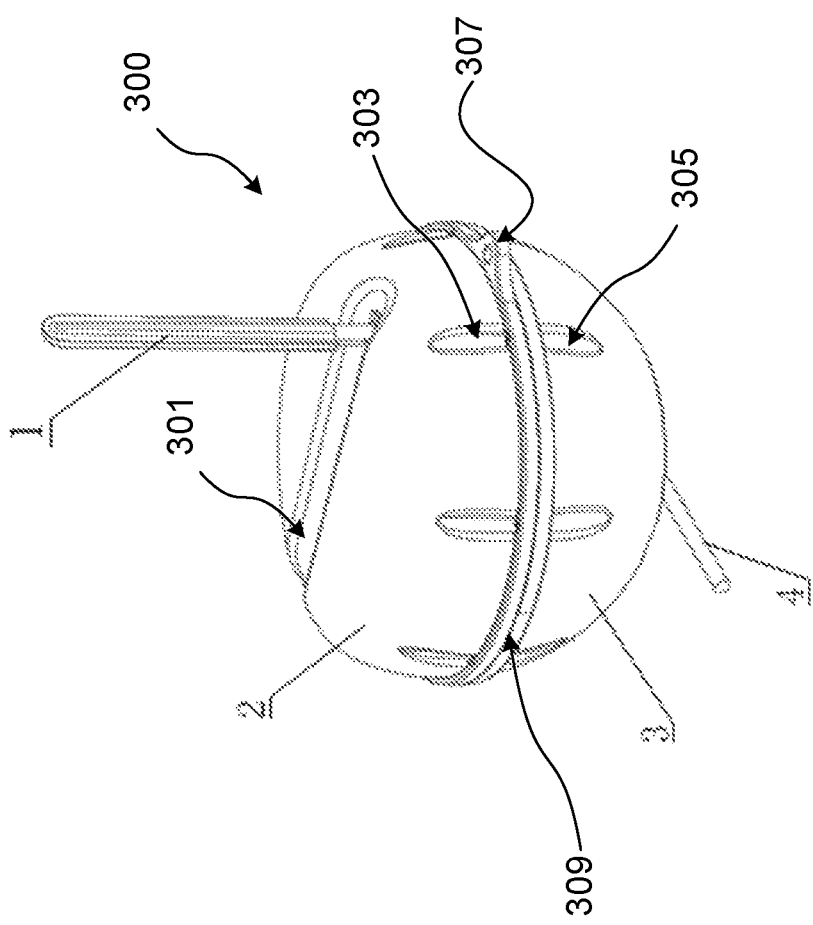
FIG. 3A is a schematic, isometric diagram illustrating a floating system in accordance with embodiments of the disclosed technology.

FIG. 3A is a schematic, isometric diagram illustrating a floating system 300 in accordance with embodiments of the disclosed technology. The floating system 300 is configured to receive a signal from an underwater device and then transmit the signal (e.g., after properly processing the signal, in some embodiments) to an abovewater device. The system 300 includes an antenna 1, an upper housing 2, a lower housing 3, and an interface component 4. As shown in FIG. 3A, the antenna 1 is positioned on a top surface of the upper housing 2. The antenna 1 has a foldable design for easy storage during transportation. The upper housing 2 is formed with an antenna recess 301 to accommodate the antenna 1 when the antenna 1 is folded. One end of the antenna 1 passes through a hole of the upper housing 2 and is coupled to components positioned inside the upper housing 2 (such as an antenna feed component or a communication module, not shown in FIG. 3A). In some embodiments, the system 300 can include a sealing component (e.g., sealant, a gasket, etc.) positioned between the hole of the upper housing 2 and the antenna 1.

The upper housing 2 is also formed with multiple upper structural recesses 303 on its outer surface. As shown, the upper structural recesses 303 are positioned circumferentially around the upper housing 2 and configured to enhance structure strength of the upper housing 2. Similarly, the lower housing 3 can be formed with multiple lower structural recesses 305 on its outer surface. As shown, the lower structural recesses 305 are positioned circumferentially around the upper housing 2 and configured to enhance structure strength of the lower housing 3. In the illustrated embodiments, the lower structural recesses 305 are positioned in alignment with the upper structural recesses 303. In other embodiments, however, the lower structural recesses 305 can be positioned without considering the locations of the upper structural recesses 303. In some embodiments, the system 300 can only have either the upper structural recesses 303 or the lower structural recesses 305.

As shown, the interface component 4 is coupled to the lower housing 3. The interface component 4 has an elongated structure such that it can be seamless coupled to a water-proof wire. In some embodiments, the interface component 4 can pass through a hole of the lower housing 3 and is coupled to components positioned inside the lower housing 2 (such as a signal converter or a data assimilation component, not shown in FIG. 3A). In some embodiments, the system 300 can include a sealing component (e.g., sealant, a gasket, etc.) positioned between the hole of the lower housing 3 and the interface component 4. In some embodiments, the system 300 can include a sealing component positioned between the interface component 4 and the water-proof wire.

As shown in FIG. 3A, the upper housing 2 and the lower housing 3 can be fixedly attached by a locking component 307. In the illustrated embodiment, the locking device can be a screw hole that enables a screw to fixedly attach the upper housing 2 and the lower housing 3. In other embodiments, the locking component 307 can include other mechanisms such as a latch. In some embodiments, the upper housing 2 and the lower housing 3 can be fixedly attached by glue. As shown in FIG. 3A, the upper housing 2 and the lower housing 3 are fixedly attached and together form an installation plane 209. Details of the installation plane 209 will be discussed in FIG. 4 and corresponding descriptions below.

Figure 3B:
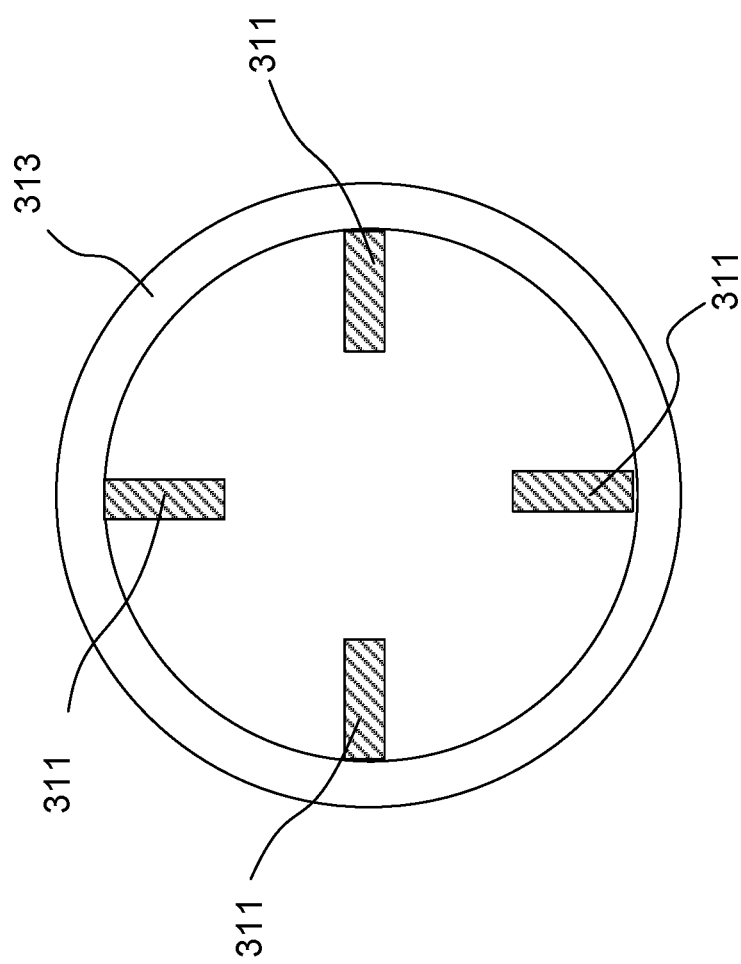
FIG. 3B is a schematic diagram illustrating multiple structural ribs positioned in a housing of the floating system in accordance with embodiments of the disclosed technology.

FIG. 3B is a schematic diagram illustrating multiple structural ribs 311 positioned in a housing 313 (e.g., either the upper housing 2 or the lower housing 3) of the floating system 300 in accordance with embodiments of the disclosed technology. As shown in FIG. 3B, four structural ribs 311 can be positioned on an inner surface of the housing 313 and configured to enhance structure strength of the housing 313. In the illustrated embodiment, the structural ribs 311 are positioned circumferentially around the housing 313. In other embodiments, however, the structural ribs 311 can be positioned at other locations depending on different designs. In some embodiments, the structural ribs 311 can be used to support or hold other components (e.g., the components 101-113 and 201-217 shown in FIGS. 1 and 2) positioned inside the housing 313.

Figure 4:
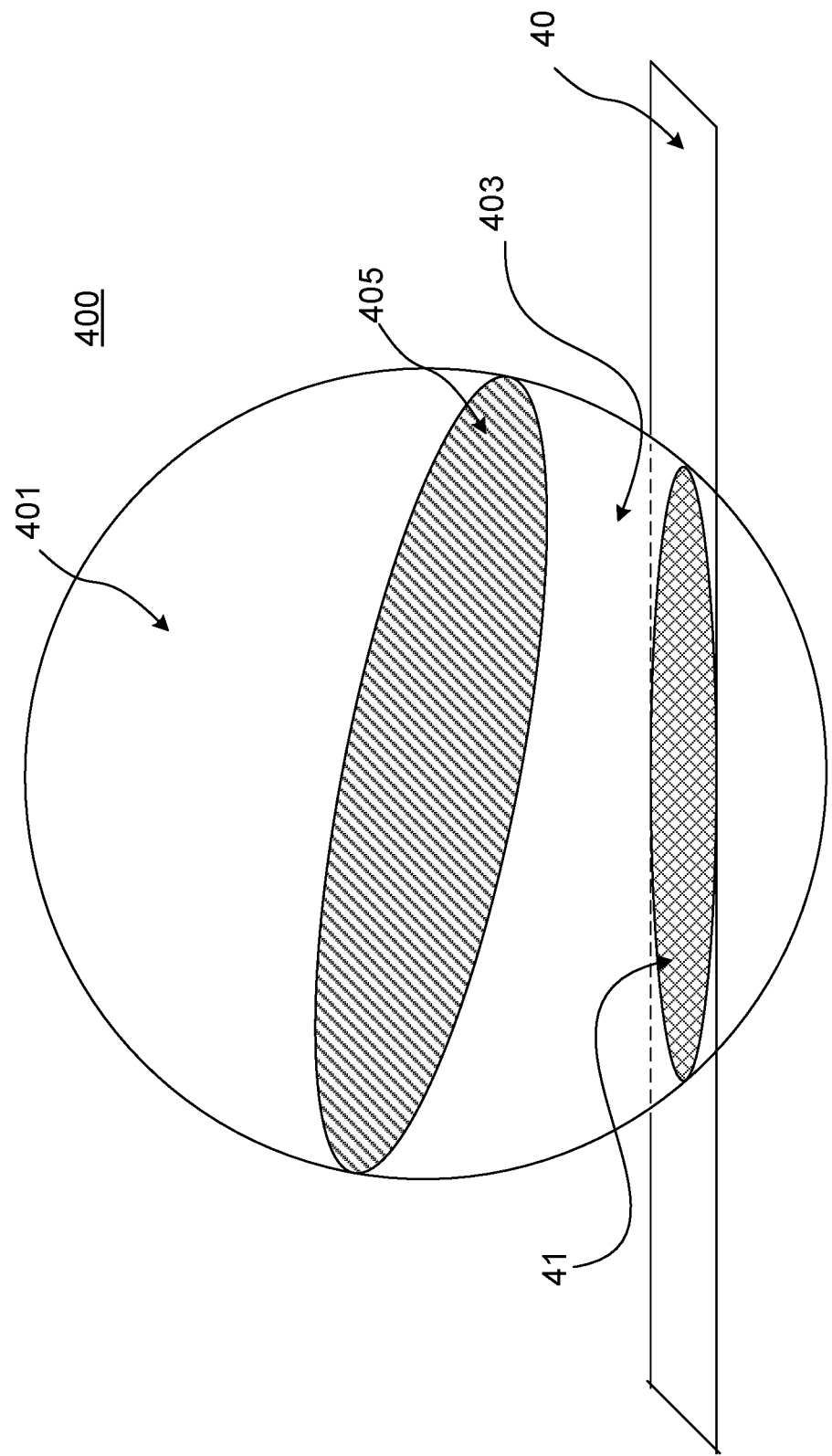
FIG. 4 is a schematic diagram illustrating an installation plane in accordance with embodiments of the disclosed technology.

FIG. 4 is a schematic diagram illustrating an installation plane 405 formed by a first housing 401 and a second housing 403 of a floating system 400 in accordance with embodiments of the disclosed technology. The floating system 400 is configured to be positioned above a fluid surface (e.g., a sea surface or a water surface) 40, whereas a portion of the system 400 is positioned under the fluid surface 40. As shown in FIG. 4, the floating system 400 and the fluid surface 40 together defines a floating surface 41. In some embodiments, the floating system 400 above the floating surface 41 is positioned abovewater, whereas the system below the floating surface 41 is positioned underwater. As shown in the illustrated embodiments, the installation plane 405 formed by the first housing 401 and the second housing 403 are preferably kept above the floating surface 41 so as to prevent possible fluid leakage into the floating system 400 (e.g., from a space or gap between the first housing 401 and the second housing 403).

Figure 5:
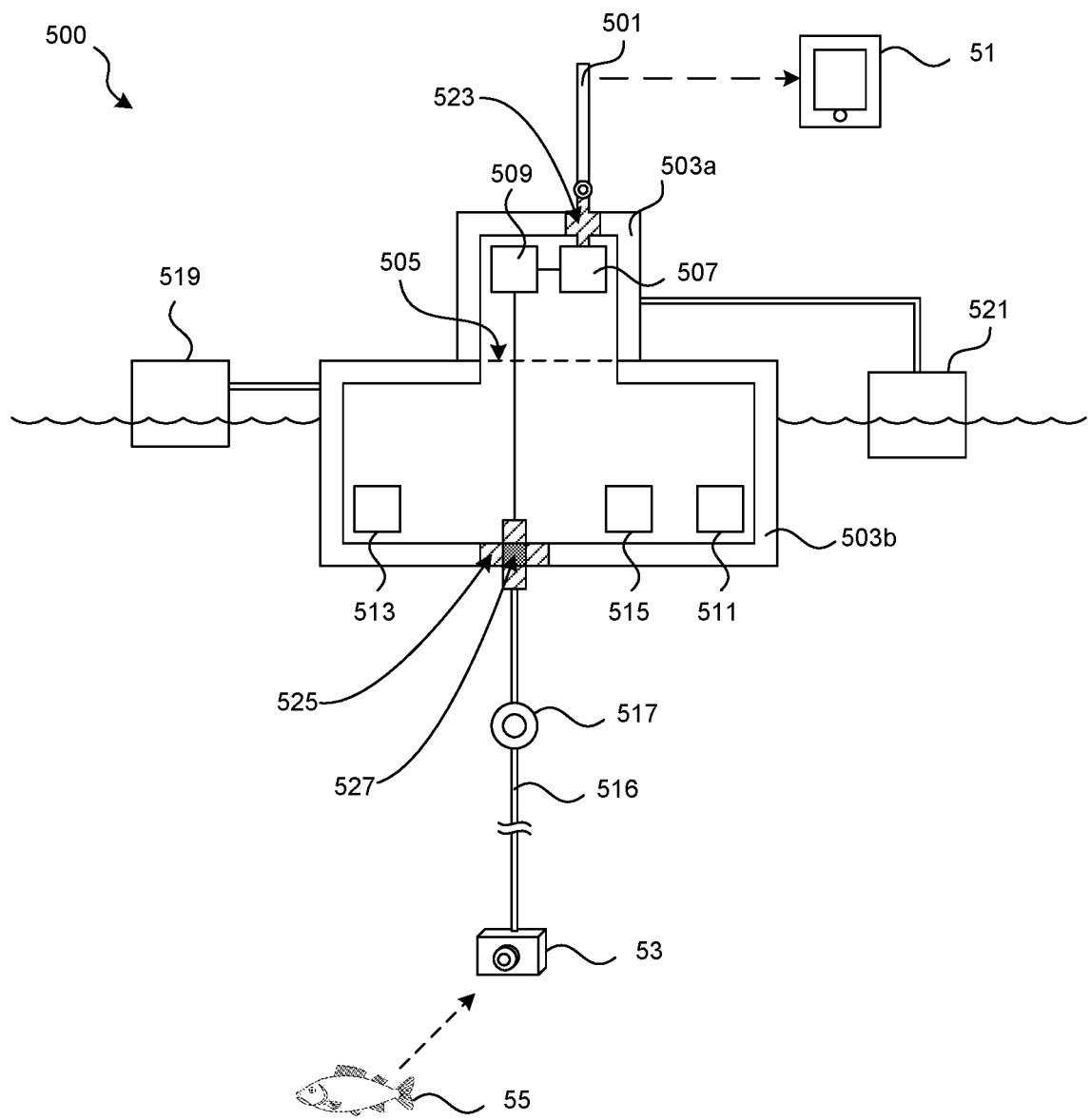
FIG. 5 is a schematic diagram illustrating a floating system in accordance with embodiments of the disclosed technology.

FIG. 5 is a schematic diagram illustrating a floating system 500 in accordance with embodiments of the disclosed technology. The floating system 500 is positioned on a water surface 50 and enables an underwater camera 53 to transmit collected images of an object-of-interest 55 (e.g., a fish) to a mobile device 51 on a real-time basis. The system 500 includes an antenna 501, a first housing 503a, a second housing 503b, an antenna feed component 507, a signal converter 509, a first ballast component 511, a second ballast component 513, a sensor 515, a cable 516, a cable buffer component 517, a first floating-aid component 519, and a second floating-aid component 521. The first housing 503a is fixedly attached to the second housing 503b. As shown in FIG. 5, the first housing 503a and the second housing 503b together define an installation plane 505. When the system 500 is in operation, in some embodiments, the installation plane 505 is positioned above the water surface 50.

The antenna 501 is coupled to the first housing 503a and configured to transmit image signals to the mobile device 51. A portion of the antenna 501 extends through a hole of the first housing 503a and is coupled to the antenna feed component 507. In the illustrated embodiment, the hole of the first housing 503a is sealed by an upper sealing component (or a first sealing component) 523. The upper sealing component 523 is configured to prevent moisture from entering into the first housing 503a. In some embodiments, the upper sealing component 523 can be a gasket, a washer, glue, etc. In some embodiments, the upper sealing component 523 can be made of plastic. In other embodiments, the upper sealing component 523 can be an elastic component made of any other suitable materials.

The antenna feed component 507 is coupled to the signal converter 509. The antenna feed component 507 acts as a signal interface between the antenna 501 and the signal converter 509. The signal converter 509 receives an image signal captured by the underwater camera 53 via the cable 516. In some embodiments, the signal converter 509 can adjust the format of the received image signal such that the adjusted image signal is recognizable by the antenna feed component 507. In some embodiment, the cable buffer component 517 can act as a buffer when the cable 516 is moved by a user such that the movement does not significantly affect the floating system 500. In the illustrated embodiment, the floating system 500 can include an interface component 527 positioned in the second housing 503b. The interface component 527 is configured to be coupled with the cable 516. In some embodiments, the interface component 527 can include a Universal Serial Bus (USB) port, a general input/output port, or other suitable connecting ports. As shown in FIG. 5, the interface component 527 can be sealed by a lower sealing component (or a second sealing component) 525. In some embodiments, the lower sealing component 525 can be an elastic component with a shape corresponding to the interface component 527 such that it can seamlessly seal the interface component 527. In such embodiments, the lower sealing component 525 can be made or plastic or other suitable elastic materials.

In some embodiments, the floating system 500 can simply have a hole positioned in the second housing 503b. In such embodiments, the cable 516 can directly pass through the hole of the second housing 503b. The hole of the second housing 503b can be sealed by the lower sealing component 525 such that water does not flow into the second housing 503b. In such embodiments, the lower sealing component 525 can be a gasket, a washer, glue, etc. In some embodiments, the lower sealing component 525 can be made of plastic. In other embodiments, the lower sealing component 525 can be an elastic component made of any other suitable materials.

The first ballast component 511 and the second ballast component 513 are configured to stabilize the system 500. For example, the first ballast component 511 and the second ballast component 513 can provide additional weights to the system 500 so as to prevent the system 500 from being violently moved or rotated by water waves or by wind. The first and second floating-aid components 519, 521 are also configured to stabilize the system 500. In the illustrated embodiment, the first floating-aid component 519 is coupled to the first housing 503a, and the second floating-aid component 521 is coupled to the second housing 503b. In other embodiments, however, there can be more than one first floating-aid components 519 coupled to the first housing 503a and more than one second floating-aid components 521 coupled to the second housing 503b. In such embodiments, the first and second floating-aid components 519, 521 can be positioned circumferentially around the system 500.

In the illustrated embodiment shown in FIG. 5, the sensor 515 is positioned inside the second housing 503b. The sensor 515 is configured to measure a status of the system. In some embodiments, the sensor 515 can be a moisture sensor to detect whether there is any water leakage in the second housing 503b.

Figure 6:
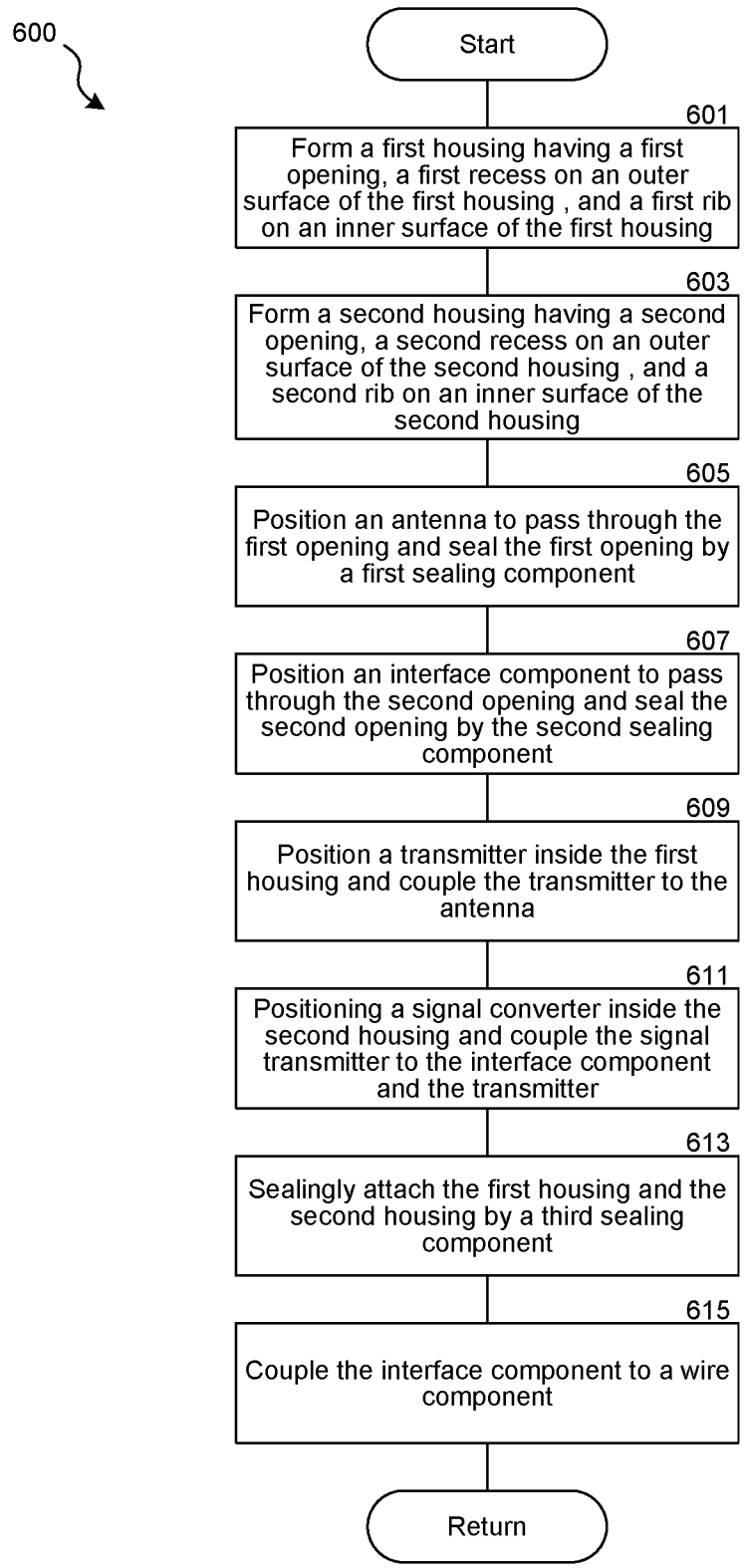
FIG. 6 is a flow chart illustrating a method in accordance with embodiments of the disclosed technology.

FIG. 6 is a flow chart illustrating a method 600 for manufacturing a floating system in accordance with embodiments of the disclosed technology. The method starts at block 601 by forming a first housing having a first opening, a first recess on an outer surface of the first housing, and a first rib on an inner surface of the first housing. At block 603, the process continues by forming a second housing having a second opening, a second recess on an outer surface of the second housing, and a second rib on an inner surface of the second housing. At block 605, the method 600 proceeds by positioning an antenna to pass through the first opening and sealing the first opening by a first sealing component.

At block 607, the method 600 then positions an interface component to pass through the second opening and seals the second opening by the second sealing component. At block 609, a transmitter is positioned inside the first housing and the transmitter is coupled to the antenna. At block 611, the method 600 continues by positioning a signal converter inside the second housing and coupling the signal transmitter to the interface component and the transmitter. At block 613, the process then sealedly attaches the first housing and the second housing by a third sealing component. At block 615, the method 600 then couples the interface component to a wire component. The method 600 then returns.

Although the present technology has been described with reference to specific exemplary embodiments, it will be recognized that the present technology is not limited to the embodiments described but can be practiced with modification and alteration within the spirit and scope of the appended claims. Accordingly, the specification and drawings are to be regarded in an illustrative sense rather than a restrictive sense.

The invention claimed is:

1. A floating system, comprising:
a first housing having a first opening;
an antenna at least partially passing through the first opening;
a second housing having a second opening configured to attach to the first housing;
an interface at least partially passing through the second opening;
a housing seal positioned between the first housing and the second housing, wherein the first housing, the second housing and the seal collectively define a chamber, wherein an installation plane is formed by the first housing and the second housing, and wherein the installation plane is positioned above a water surface, and;
a transmitter positioned in the chamber and coupled to the antenna;
a signal converter positioned in the chamber and coupled to the transmitter and the interface;
a wire coupled to the interface;

a first set of floating-aids positioned circumferentially around the first housing, each of the first set floating-aids connecting to the first housing at a first location of the first housing, the first location being above the installation plane; and a second set of floating-aids positioned circumferentially around the second housing, each of the second set of floating-aids connecting to the second housing at a second location of the second housing, the second location being under the installation plane, the second location being positioned above the water surface;

wherein the wire receives an image signal from an underwater device, and the image signal is transmitted to the signal converter via the interface, and the image signal is converted by the signal converter to form a converted image signal, and the converted image signal is transmitted to the antenna via the transmitter;

wherein a plurality of structural ribs are formed on an inner surface of the first housing; and wherein the plurality of structural ribs are circumferentially positioned on the inner surface of the first housing.

2. The floating system of claim 1, further comprising:
a first seal positioned adjacent to the first opening, wherein the antenna is sealed by the first seal; and
a second seal positioned adjacent to the second opening, wherein the interface is sealed by the second seal.

3. The floating system of claim 1, wherein the converted image signal is transmitted, by the antenna, to a remote device via a wireless network.

4. The floating system of claim 3, wherein the remote device includes an unmanned aerial vehicle (UAV).

5. The floating system of claim 1, wherein the antenna is a foldable antenna, and wherein the foldable antenna is at least partially positioned outside the chamber.

6. The floating system of claim 5, wherein the first housing is formed with an antenna recess configured to accommodate the foldable antenna.

7. The floating system of claim 1, wherein a plurality of structural recesses are formed on an outer surface of the first housing, and wherein the structural recesses are configured to enhance a structure strength of the first housing.

8. The floating system of claim 1, wherein a plurality of additional structural ribs are formed on an inner surface of the second housing.

9. The floating system of claim 1, wherein the wire is coupled to an underwater camera via a wire buffer.

10. The floating system of claim 1, wherein the first housing includes a first hemisphere having a first radius and the second housing includes a second hemisphere having a second radius.

11. The floating system of claim 10, wherein the second radius is greater than the first radius.

12. The floating system of claim 10, wherein the second radius is the same as the first radius.

13. A signal transmission system, comprising:
an upper housing having a first opening;
an antenna at least partially passing through the first opening;
a second housing having a second opening configured to seal the first housing;
an interface at least partially passing through the second opening;
a lock configured to connect the first housing and the second housing, wherein the first housing and the second housing collectively define an enclosed space, wherein an installation plane is formed by the first housing and the second housing, and wherein the installation plane is positioned above a water surface;
a wire coupled to the interface;
a first set of floating-aids positioned circumferentially around the first housing, each of the first set floating-aids connecting to the first housing at a first location of the first housing, the first location being above the installation plane; and
a second set of floating-aids positioned circumferentially around the second housing, each of the second set of floating-aids connecting to the second housing at a second location of the second housing, the second location being under the installation plane, the second location being positioned above the water surface;
wherein the wire receives data from an underwater device, and the data is transmitted via the interface to the antenna;
wherein a plurality of structural ribs are formed on an inner surface of the upper housing; and
wherein the plurality of structural ribs are circumferentially positioned on the inner surface of the upper housing.

14. The signal transmission system of claim 13, further comprising an antenna feed coupled to the antenna.

15. The signal transmission system of claim 13, wherein the processed data is transmitted, by the antenna, to a mobile device via a wireless network in a real-time fashion.

16. The signal transmission system of claim 13, further comprising a level sensor configured to monitor a status of the system.

17. The signal transmission system of claim 13, further comprising a moisture sensor configured to monitor a status of the system.

18. A method for manufacturing a floating signal-transmission system, comprising:
forming a first housing having a first opening, a first recess on an outer surface of the first housing, and a plurality of first ribs on an inner surface of the first housing, wherein the plurality of first ribs are circumferentially positioned on the inner surface of the first housing;
forming a second housing having a second opening, a second recess on an outer surface of the second housing, and a plurality of second ribs on an inner surface of the second housing, wherein the plurality of second ribs are circumferentially positioned on the inner surface of the second housing;
forming an installation plane by the first housing and the second housing, wherein the installation plane is configured to be positioned above a water surface;
positioning an antenna to pass through the first opening;
sealing the first opening by a first seal;
positioning an interface to pass through the second opening;
sealing the second opening by the second seal;
positioning a transmitter inside the first housing;
coupling the transmitter to the antenna;
positioning a signal converter inside the second housing;
coupling the signal transmitter to the interface and the transmitter;
sealing the first housing and the second housing by a third seal;
coupling the interface to a wire;
positioning a first set of floating-aids circumferentially around the first housing, each of the first set floating-aids connecting to the first housing at a first location of the first housing, the first location being above the installation plane, the second location being positioned above the water surface; and positioning a second set of floating-aids circumferentially around the second housing, each of the second set of floating-aids connecting to the second housing at a second location of the second housing, the second location being under the installation plane.

19. The signal transmission system of claim 13, wherein the first housing includes a first dimension and the second housing includes a second dimension, and wherein the first dimension is smaller than the second dimension.

20. The method of claim 18, wherein the first housing includes a first dimension and the second housing includes a second dimension, and wherein the first dimension is smaller than the second dimension.

* * * * *